Aug. 17, 1971 H. C. NATHANSON ET AL 3,600,292

LOCALIZED MACHINING AND DEPOSITION FOR MICROELECTRONIC COMPONENTS BY SPUTTERING

Filed March 11, 1969

2 Sheets-Sheet 1

INVENTORS
Harvey C. Nathanson
and John R. Davis, Jr.
BY Gordon H. Telfer
ATTORNEY 3,600,292

LOCALIZED MACHINING AND DEPOSITION FOR MICROELECTRONIC COMPONENTS BY SPUTTERING

Harvey C. Nathanson, Pittsburgh, and John R. Davis, Jr., Export, Pa., assignors to Westinghouse Electric Corporation, Pittsburgh, Pa.

Filed Mar. 11, 1969, Ser. No. 806,264
Int. Cl. C23c *15/00*
U.S. Cl. 204—192 14 Claims

ABSTRACT OF THE DISCLOSURE

A sputtering process is described that is suitable for highly localized deposition and machining of elements of microelectronic components employing a stream of gas in an atmosphere at least within an order of magnitude of atmospheric pressure between closely spaced sputtering electrodes which are preferably supported by the component substrate. Applications to microelectronic components such as for tuning the vibratory members of resonant gate transistors are described.

ACKNOWLEDGEMENT OF GOVERNMENT CONTRACT

The invention herein described was made in the course of and under a contract with the Department of the Air Force.

BACKGROUND OF THE INVENTION

Field of the invention

This invention relates generally to the fabrication of microelectornic components by the use of a gas sputtering technique.

Description of the prior art

Sputtering is a known technique for metal deposition and involves locating a pair of electrodes, of which one is the source of material to be deposited, with an ionizable gas therebetween and applying a voltage to initiate a discharge causing material from the cathode to be released. Sputtering has been used to some extent for the deposition of layers of metal on microelectronic components wherein an entire surface of a substrate is so coated. In some instances sputtering has been proposed for material removal to shape the "cathode" to a particular desired configuration. The prior art has used gases at low pressures for efficient deposition or material removal. The area of deposition in accordance with the prior art is not highly localized.

The need for highly precise, localized micromachining for deposition or trimming of elements of microelectronic components arises in a number of instances of which an example is that of resonant gate transistors as described in Nathanson and Wickstrom Pat. 3,413,573 that employs a small vibratory member, such as a cantilever, whose characteristic resonant frequency depends upon its dimensions. Typically, after initial fabrication in accordance with prior technology such as that disclosed in the above patent and in copending applictaion Ser. No. 733,582, filed May 31, 1968, now U.S. Pat. No. 3,539,705 by the present inventors and assigned to the present assignee, the center frequencies of the cantilever beams can have as much as ±15% variation from what was intended. For a device of high frequency selectivity, Q, a means is desired to fine tune the cantilever to within at least (20/Q)% of the desired center frequency to assure that transmitters and receivers made of RGT's are well within a bandwidth of each other. Thus for Q equal to 100, only 0.2% variation in beam frequency is tolerable, which is much tighter than can presently be achieved by state-of-the-art electroplating and photoresist technology.

A fine tuning scheme should be inexpensive. This requires speed, a minimum of complicated and critical steps, and the possibility being fully automatic by the operator merely selecting the ultimately desired frequency. Sensitivity is required in the sense of being able to precisely control the tuning procedure over many decades of frequency so as to permit the continuously zeroing-in on the target frequency. Additionally, high temperatures and other ambient conditions that may be destructive to other elements of the microelectronic component must be avoided during tuning.

Among prior proposals for RGT beam tuning have been a gaseous etch process. Gaseous etching of nickel by carbon monoxide has been demonstrated but found to proceed too slowly below 250° C. to provide a practical tuning scheme. Also, in instances in which arrays of cantilevers are in the same structure, confining the gaseous etch is a difficult problem.

Also previously considered have been conventional evaporation techniques to evaporate metal onto selected cantilevers to tune them. This however requires complicated precision shuttering since the beams are so small. In addition, appreciable mass is needed to change the beam frequency, leading to the possibility of bimetallic or residual strain effects after tuning, which may lead to instabilities in final beam frequency. It is undesirable to change the composition of the beam system during tuning.

In "Research on the Resonant Gate Transistor" by Newell et al., Second Interim Report, dated Mar. 1, 1967, under Air Force Contract F33615–67–C–1021, is described a proposal to use sputtering to modify cantilever dimensions. Experiments were performed in room air at atmospheric pressure in which the beam was the cathode and the anode was a tugsten point of 6 to 8 microns radius. Problems were encountered in stabilizing the discharge and confining the geometry of both the arc and its products.

In a number of other instances besides cantilevers for RGT's, it is desirable to be able to precisely tailor elements of a microelectronic component as to geometry, composition, frequency, resistivity or other parameters.

SUMMARY OF THE INVENTION

This invention provides a readily implemented process for micromachining on a scale compatible with microelectronic component fabrication employing sputtering with a gaseous atmosphere pressure at least within an order of magnitude of atmospheric pressure. The electrodes are closely spaced such that, for most gases, the product of the gas pressure, in millimeters of mercury, and the distance between the electrodes, in millimeters, is within the range of from about 2 to about 10. A stream of the sputtering gas between the electrodes has been unexpectedly found necessary for stability of the discharge.

There has been previously disclosed in copending application Ser. No. 733,582, filed May 31, 1968, now U.S. Pat. 3,539,705 of Nov. 10, 1970, for forming closely spaced conductors, such as about 10 microns or less. This invention is predicted in part upon the recognition that such closely spaced conductors may not only be used as sputtering electrodes but they are ideally suited for sputtering at pressures near atmospheric, if a suitable gas stream is employed, thus permitting a speed and facility that is most attractive from microelectronic component fabrication.

The invention therefore has as its general object the provision of a process for micromachining microelectronic device components using localized gaseous sputtering at or near atmospheric pressure. Additionally, objects include the provision of a precise readily implemented tuning mechanism for vibratory members of resonant gate transistors as well as several additional specific applications in the microelectronic component field.

DESCRIPTION OF THE PREFERRED EMBODIMENTS

The invention utilizes a controlled glow discharge in a stream of gas or near atmospheric pressure for the addition or removal of material from a metallic element. In the case of the cantilever beam of a resonant gate transistor, the beam is provided with the more negative voltage to make it the cathode of the sputtering apparatus. In this process, energetic positive gas ions formed in the plasma bombard the cathode, knocking out atoms of the cathode in the process. By etching away metal, particularly near the clamped end of a cantilever beam, the spring-constant of the system is lowered and thus causes the frequency of the system to decrease.

Figure 1:
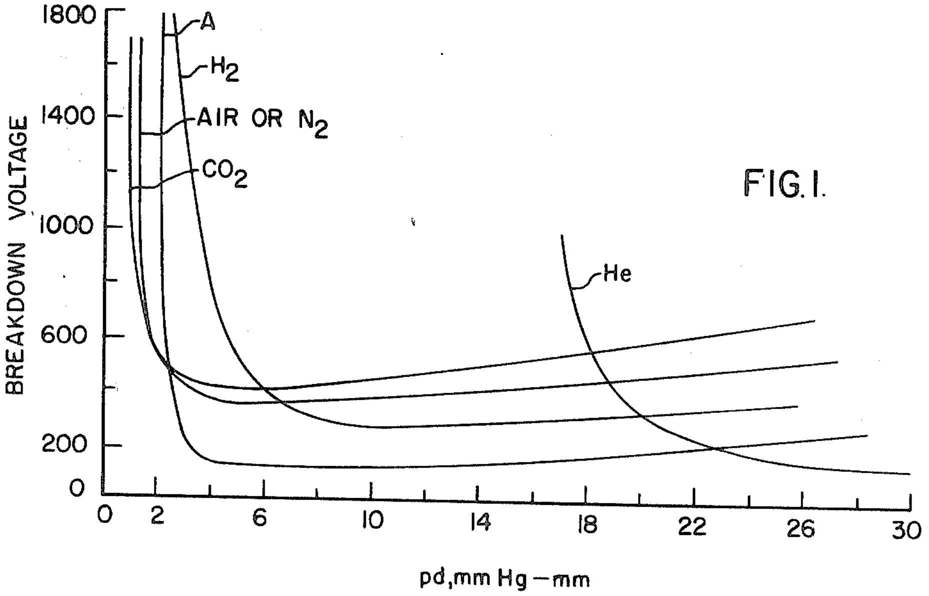
FIG. 1 is a set of curves useful in understanding the present invention.

In FIG. 1 are illustrated curves of the breakdown voltage plotted against the product of pressure $p$ and electrode spacing $d$ for various common gases. These curves, available from known data, are called Paschen curves and illustrate, such as for air or nitrogen, a minimum at about 325 volts at a pressure times distance product of 5.67 mm. Hg–mm. At atmospheric pressure, the pressure equalizing 760 millimeters of mercury, the value of $d$ required to operate at the minimum glow voltage of 325 volts is about 0–0075 mm. or 7.5 microns.

Air gaps of this range of dimension can now be routinely batch-gabricated using methods as are described in above-mentioned copending application Ser. No. 733,582. Thus in accordance with this technology the electrode configuration necessary for precision sputtering, such as for tuning the RGT, is readily provided at the same time as the RGT metallization is formed.

Besides the convenience of being able to work at atmospheric pressure, is the fact that the cathode drop region in nitrogen at atmospheric pressure is about 4 to 5 microns thick, equal to about 100 kinetic means mean free paths. The glow discharge will therefore be highly localized and waste products should be thermalized in a very short distance after leaving the plasma and remain in or near that location.

From FIG. 1, for several common gases, it is generally preferred to operate at a $p \times d$ product within the range of from about 2 to about 10 mm. Hg–mm. That range generally makes compatible pressures near atmospheric, electrode spacing that are no more than about 10 microns, and moderate breakdown voltages. An exception is helium which, for the spacings of interest, would require considerably higher gas pressure.

In general, a pressure at least as great as within an order of magnitude of atmospheric pressure is suitable. Normally it would be preferred that it be at least about 500 mm. Hg and may range upward to about 10,000 mm. Hg in some situations. The ability to operate at atmospheric pressure, 760 mm. Hg, is of course desirable to permit use of the technique in normal room air.

Although a discharge can be made to occur in room air, or other atmospheres that are essentially static, notwithstanding some circulation or replenishment, such static atmospheres have been found unsuitable for good reproducibility and control. An important feature of the process in accordance with this invention is that a gas stream be supplies between the electrodes. When a gas stream is supplied, the discharge is much more stable and reproducible and the rate of material removal is more controllable. The reasons for the greatly improved results with a gas stream as compared with a static atmosphere are not presently understood.

A suitable gas stream has been found to be one whose velocity is at least equivalent to that resulting from a nozzle velocity of about 10 cm./sec., where the nozzle or orifice is spaced about 0.25 cm. form the interelectrode gap. Too high a velocity is also detrimental. Thus it has been found preferred to limit the nozzle velocity, for the described spacing, to about 1000 cm./sec.

A suitable stream of sputtering gas can, for example, be conveniently provided by a small jet of gas located to direct the stream between the electrodes. Suitable conditions include the use of a jet with an orifice having a diameter in the range of from about 0.05 cm. to about 0.25 through which the gas flow rate is in the range of from about 1 cm.$^3$/sec. to about 10 cm.$^3$/sec. with the jet orifice located in the range of from about 0.1 cm. to about 0.5 cm. Alternatively, the gas stream can be made to flow with larger cross-sectional area. The use of a local jet does, however, facilitate the provision of the proper conditions between the electrodes.

Figure 2:
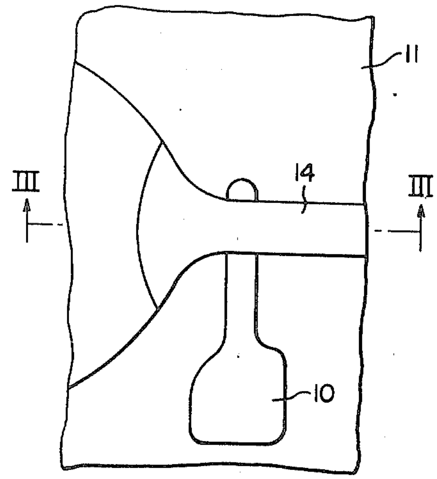
FIGS. 2 and 3 are plan and sectional views, respectively, of a portion of a microelectronic component with which the present invention may be practiced.
Figure 3:
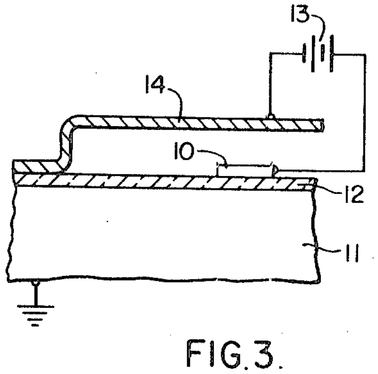

FIGS. 2 and 3 illustrate a device geometry for performing micromachining by sputtering. A conventional RGT structure (not shown in full) has been modified to include an anode 10 about ½ mil wise fabricated on the oxide layer 12 on the substrate 11 toward the rear of and about 5 microns or less under the RGT beam 14. A voltage supply, represented by battery 13, is connected with its negative terminal to the beam 14 and its positive terminal to anode 10. The supply preferably provides a voltage at near the minimum of the Paschen curve for the particular gas used.

It is interesting that since the anode-to-cathode perpendicular distance can be less than the minimum sparking distance at atmospheric pressure (which in the case of nitrogen or air is about 5 microns), sputtering is inhibited perpendicularly between the beam and anode and instead proceeds by fringe fields occurring at the periphery of the intersection of the projections of the two electrodes. By forcing the sputtering to occur at the fringe field, the effective air gap remains constant as the beam erodes away so sputtering can be continued until the desired result is reached and will not shut itself off.

Since the anode voltage during sputtering may rise as high as 400 volts, it is necessary to incorporate a relatively thick oxide 12 (or other insulating layer) under the anode 10 to permit the substrate to be grounded during the tuning operation. This is desirable in order to be able to operate the RGT to check progress during the tuning operation. It would be desirable to employ a layer of silicon dioxide of at least about 8000 A. thickness under the anode although somewhat thinner oxides, about 5500 A. have been used successfully.

Figure 4:
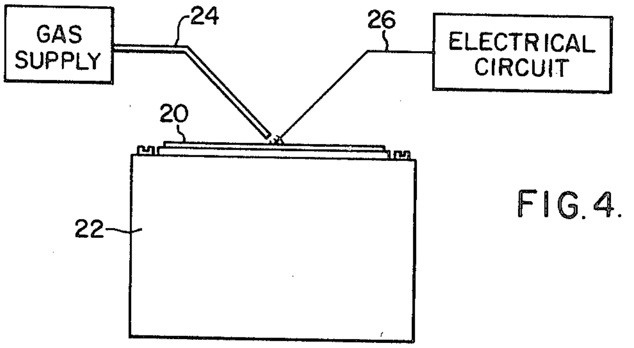
FIG. 4 is a schematic illustration of an arrangement of apparatus with which the invention may be practiced.

It has been found that sputtering proceeds more controllably and at lower voltages in dry nitrogen rather than room air. This difference cannot be fully accounted for. An example of an arrangement of apparatus is illustrated in FIG. 4 and may include the workpiece 20 on a vacuum chuck 22, the workpiece being a slice of silicon having an oxidized surface and some cantilever beams to be fine tuned, for example. Dry nitrogen evaporated from a liquid is blown into the active sputtering region of the RGT by means of a small capillary tube 24 (#16 hypodermic needle) of about 25 mils inside diameter mounted on a modified fixture of a commercially available electrical point probe. The gas jet is retractible with the other electrical point probes 26 used for testing and for aplying sputtering voltage so that the gas probe plus electrical probes can be stepped as a unit around the silicon slice permitting rapid testing and tuning. A gas flow rate of 0.2 standard cubic feet per hour (or 200 cubic centimeters per minute) through the capillary assures complete expulsion of the surrounding air from the cathode to anode region during sputtering. Gas flow rate is not critical providing all the air is expelled from the region where sputtering is to take place. Since the capillary is so close to the active region, being about 50 mils distant, low flow rates are possible. Too high a flow rate unnecessarily blows the neutral gas products, mainly gold dust from a gold cantilever, to other regions of the chip. With very low gas flow rates plus an optimally placed jet, most waste products can be kept with about 1 mil of the sputtering region.

When voltage of at least the sustaining voltage magnitude is applied across the electrodes, being 250 to 270 volts in dry nitrogen as compared with 325 to 375 volts or more in room air, a purple glow is seen in the vicinity of the electrodes. The extent of this glow region increases with current and is typically about 6 microns in extent at intermediate current levels. Typically anode current is about 250 microamperes at a cathode voltage drop of 270 volts. Arc dissipation is therefore about 60 milliwatts. Such arcs are found to be quite bright light sources.

Figure 5:
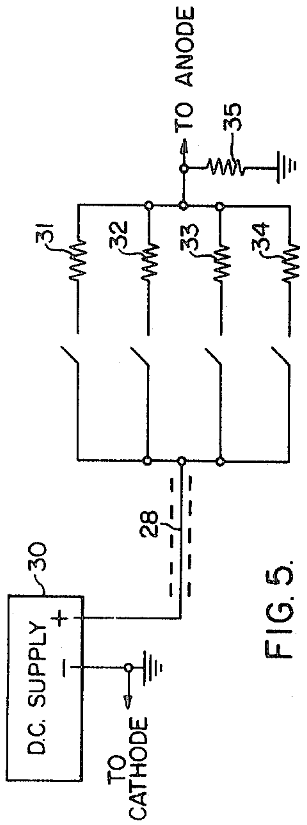
FIG. 5 is an electrical circuit suitable for use in practicing the invention.

The sputtering voltage supply can be readily provided. As shown in FIG. 5, it may consist of a D.C. 500 volt stabilized source 30 in series through a shielded conductor 28 with each of four ¼ watt resistors 31, 32, 33 and 34 of values of 0.5, 1, 2, and 7 megohms, respectively. A sputtering current of between 25 to 500 microamperes can be obtained over this resistance range. At the high current end, the glow region is too large and diffuse, perhaps 1 mil in radius, and spattering of metal can occur. At the low current end, sputtering proceeds at about the slowest rate still consistent with frequency trimming in a reasonable time. Currents as low as 5 microamperes have been tried and although controlled sputtering results, the rates were too low to be of practical utility for RGT tuning. A resistor 35 of about 500 megohms may be connected between the anode and ground. The sputtered products on the substrate can be readily cleaned by a one second dip in aqua regia diluted 3:1 with water.

In general, the anode is not consumed during the sputtering operation, with a D.C. supply, since it is bombarded by low momentum electrons rather than the high momentum positive ions which sputter the cathodic electrode. Thus it is possible to make the anode much thinner than the beam which is to be sputtered. If however the anode is made too thin then small random oxide pinhole faults under the anode will cause the thin anode to act as a fuse and open-circuit itself even at currents as low as 50 microamperes. It has been found that a 2 micron thick anode is sufficient to sputter an 8 micron thick cantilever beam without anode deterioration.

It has been found that a substantial quantity of material may be removed by the process. For instance, tuning has been performed which resulted in a beam reduced from the width of about 37 microns to the width of about 7 microns at a point near its fixed end resulting in a frequency decrease after trimming of this 4100 hertz element by about 30%, resulting in a 2800 hertz device. It will be noted that increasing the width of the anode will increase the area of the thinned region of the beam. Close examination of structures formed in accordance with this invention under a scanning electron microscope indicates that true atom-by-atom sputtering occurs rather than merely melting or uncontrolled spattering.

Figure 6:
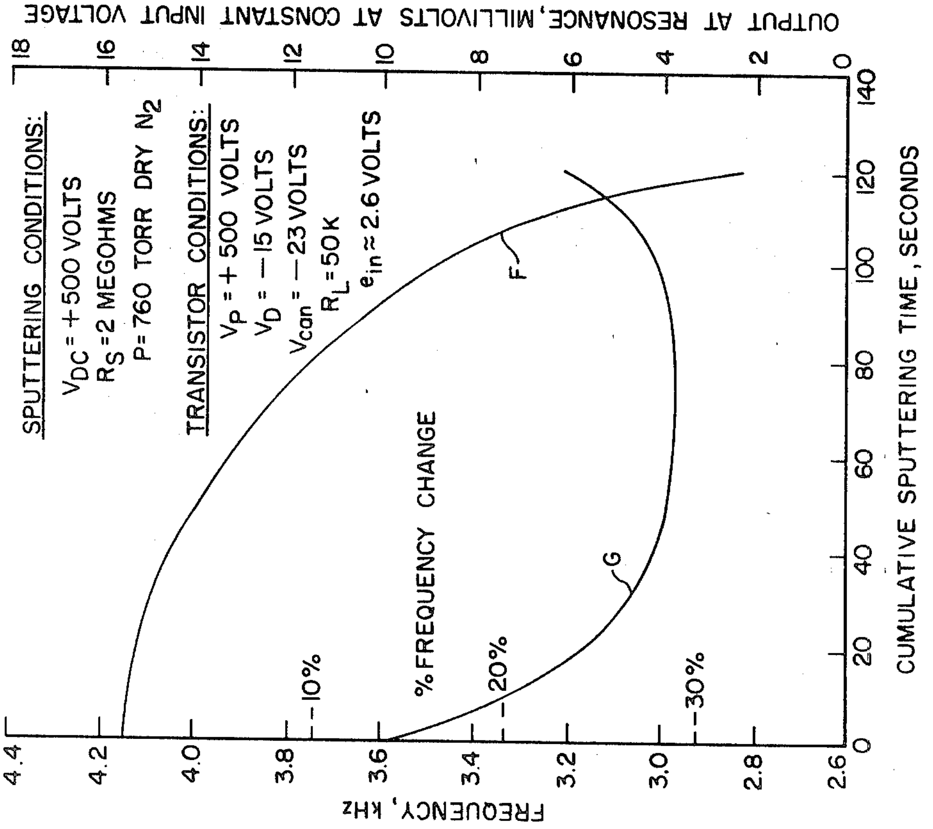
FIGS. 6 and 7 are curves of data with respect to the practice of the invention for sputtered tuning of vibratory members of resonant gate transistors.

In FIG. 6 is illustrated a typical tuning curve of frequency and output versus cumulative sputtering time taken from a set of nominally four kilohertz RGT's. In curve F has been plotted $f_0$, the device resonant frequency, versus seconds of sputtering time at a D.C. sputtering supply of 500 volts with a series resistance of 2 megohms. This corresponds to a sputtering current of about 125 microamperes. Various bias voltages on the device during operation are indicated in the figure; $V_P$ is the MOS floating gate pad voltage, $V_D$ is the drain to source voltage on the RGT detector element, $V_{can}$ is the cantilever voltage. The frequency scale to the left is also marked to indicate percentage decrease in original resonant frequency. It is apparent that the decrease in resonant frequency is not linear with respect to total sputtering time $t$ but in fact seems to be of the form $$\frac{\Delta f}{f_0} = Kt^2$$

where the value of K will depend on a number of factors, principally the anode current, the beam thickness and the anode geometry. One can see by the frequency curve in FIG. 6 that it is possible to tune an RGT over a 5% range in about a minute at 125 microamperes. By increasing the current density by a factor of three and increasing the width of the anode a factor of two, it is estimated that a 5% range can be accomplished in well below 10 seconds. This is sufficiently fast to permit an economic RGT tuning operation. As can be seen in the figure a wider frequency range is available down to −30% but at the expense of increased tuning time. At about −30% tuning, the appearance of the beam is such that it is very narrow at the sputtered portion. A wider anode should permit a greater tuning range.

Also shown in the figure is curve G of the gain of the RGT at fixed bias as sputtering proceeds. The RGT structure for these curves (FIGS. 6 and 7) was in accordance with that disclosed in copending application Ser. No. 795,671, filed Jan. 31, 1969, by Nathanson et al. and assigned to the present assignee. Because the MOS transistor is within a few mils of the anode, the initial layer of sputtered gold adds to the parasitic capacitance of the floating gate of the device, causing a decrease in gain of typically 6 to 10 db. After the gold layer becomes sufficiently conductive, the gain stabilizes finally increasing again as the pull-in voltage begins to decrease and the rigidity of the beam decreases for deeply cut notches. It would be desirable to incorporate the MOS transistor detector element at the front of the cantilever beam well away from the sputtering electrode to reduce the observed decrease in gain due to the sputtered products. This should also eliminate a secondary effect which is the tendency of the conductance of the localized sputtering plasma to short out the negative bias on the high impedance floating gate electrode. By placing instead the RGT input electrode between the anode and MOS transistor, this relatively low impedance electrostatic shield between the two should minimize or eliminate interaction.

Figure 7:
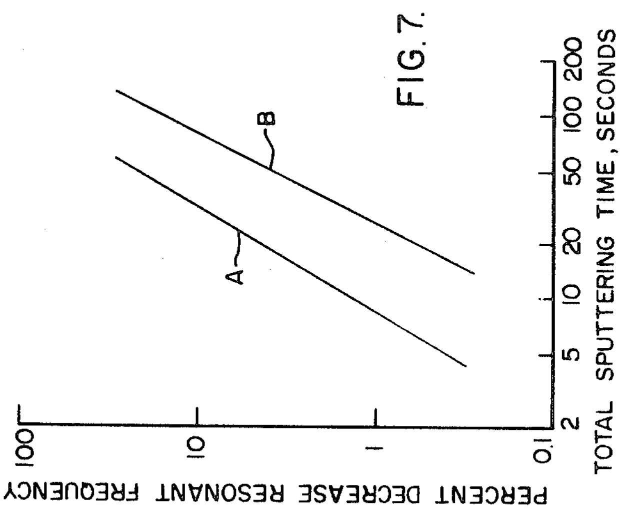

FIG. 7 illustrates in curves A and B the effect of the magnitude of sputtering current on the tuning rate for the RGT. In this figure, two different series resistances, 1 and 2 megohms respectively, have been used to tune identical RGT's (like those previously described) using the same identical D.C. sputtering supply of +500 volts. The two anode currents are approximately 250 and 125 microamperes respectively.

The sputtering operation may be improved by pulsed application of the sputtering voltage to give advantages such as better rate control and more localized confinement of sputtered products. RF sputtering may also be employed as desired, such as for deposition of dielectric materials.

The example given before in tuning RGT's uses electrical operation of the MOS detector of the device as an indication when sufficient sputtering has occurred. However, other means may be employed such as comparison with a mechanically vibrating system or optical techniques such as use a stroke light at a suitable frequency.

The localized metal deposition and removal in accordance with this invention makes possible such applications as the localized deposition of metals, insulators, or combinations thereof (cermets), such as to form thin or thick film circuits containing adaptable cermet shunt paths. An another example, a complex conductor pattern, such as for a read-or-write memory system, may be formed and modified by forming conductive paths using this invention.

For deposition of materials by this process, the arrangement of electrodes may be other than as shown in FIGS. 2 and 3. For example, the electrodes may each be supported by, but with portions spaced over, the substrate. The horizontal gap between the electrodes defines the electrode spacing. Sputtered material will deposit on the substrate under the gap.

The invention may be practiced using any of a variety of gases including, by way of example, those selected from the group consisting of the noble gases (such as argon, neon, helium, krypton, and xenon), nitrogen, hydrogen, nitrogen which is dry (evaporated from liquid $N_2$) has been found particularly satisfactory. Additionally reactive gases such as oxygen may be used in reactive sputtering.

Selection of electrode materials may be made in accordance with known sputtering techniques. They may include metallic elements, alloys, or dielectric coated metals (where the dielectric is to be deposited).

Additional modifications and applications will suggest themselves to those skilled in the art.

We claim as our invention:

1. A sputtering process suitable for localized deposition and machining of elements of microelectronic components, said process comprising: directing a stream of gas between first and second electrodes spaced at a distance of no more than about 10 microns of which one comprises material to be removed therefrom, said gas being in an atmosphere having a pressure at least as great as within an order of magnitude of standard atmospheric pressure said pressure and the distance between electrodes are such that their product, in mm. Hg times mm., is in the range of from about 2 to about 10; applying an electrical potential across said electrodes sufficient to establish an electrical glow discharge therebetween, said potential being a voltage of up to about 500 volts at a current between about 25 and 500 microamperes.

2. The subject matter of claim 1 wherein: said gas is selected from the group consisting of a noble gas, air, nitrogen, hydrogen and oxygen.

3. The subject matter of claim 1 wherein: said pressure is at least about 500 mm. Hg.

4. The subject matter of claim 1 wherein: said stream of gas has a velocity between said electrodes equivalent to that resulting from a nozzle velocity within the range of from about 10 cm./sec. to about 1000 cm./sec. at a distance of about 0.25 cm. from said electrodes.

5. The subject matter of claim 1 wherein: said electrical potential is applied from an RF source.

6. The subject matter of claim 1 wherein: said gas stream is supplied as a jet through an orifice having a diameter in the range of from about 0.05 cm. to about 0.25 cm., with a flow of about 1 $cm.^3$/sec. to about 10 $cm.^3$/sec., said orifice being spaced a distance of from about 0.1 cm. to about 0.5 cm. from the spaced between said electrodes.

7. The subject matter of claim 6 wherein: said gas jet is of dry nitrogen employed within an atmosphere of room air.

8. The subject matter of claim 1 wherein: said first electrode is a film of metal disposed on a substrate; said second electrode is a metal member with a portion affixed to said substrate and a portion suspended over said first electrode.

9. The subject matter of claim 8 wherein: said first and second electrodes are in a configuration of intersecting lines.

10. The subject matter of claim 8 wherein: said substrate comprises at least one microelectronic element to which at least one of said first and second electrodes is attached.

11. The subject matter of claim 10 wherein: said substrate comprises a body of semiconductor material.

12. The subject matter of claim 11 wherein: said substrate also comprises a layer of insulating material over said body and said first electorde is disposed on said layer of insulating material.

13. The subject matter of claim 8 wherein: said substrate has thereon a plurality of pairs of said first and second eletcrodes and said process further comprises individually applying said elecrical field between each of said pairs.

14. The subject matter of claim 13 wherein: a stepping gas jet is employed to provide the atmosphere between each pair of electrodes to which said voltage is applied.

References Cited

UNITED STATES PATENTS

| | | | |
|---|---|---|---|
| 2,505,370 | 4/1950 | Sykes | 204—192 |
| 2,760,036 | 8/1956 | Raymer | 204—192 |
| 3,028,262 | 4/1962 | Klingsporn | 204—192 |
| 3,235,476 | 2/1966 | Boyd et al. | 204—192 |

OTHER REFERENCES

Newell et al., "Research on the Resonate Gate Transistor," Second Interim Report, Mar. 1, 1967 under Air Force Contract F–33615–67–C–1021.

JOHN H. MACK, Primary Examiner

S. S. KANTER, Assistant Examiner